US009685196B2

(12) United States Patent
Chitnis et al.

(10) Patent No.: US 9,685,196 B2
(45) Date of Patent: Jun. 20, 2017

(54) SHARING AND SYNCHRONIZING CONTENT

(71) Applicant: Verizon Patent and Licensing Inc., Arlington, VA (US)

(72) Inventors: Siddharth Chitnis, Irving, TX (US); Michael R. Oliver, Wayne, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 126 days.

(21) Appl. No.: 14/489,012

(22) Filed: Sep. 17, 2014

(65) Prior Publication Data

US 2016/0078903 A1    Mar. 17, 2016

(51) Int. Cl.
*H04N 5/765* (2006.01)
*G11B 27/19* (2006.01)

(52) U.S. Cl.
CPC ............ *G11B 27/19* (2013.01); *H04N 5/765* (2013.01)

(58) Field of Classification Search
None
See application file for complete search history.

(56) References Cited

U.S. PATENT DOCUMENTS

| 2004/0127242 A1* | 7/2004 | Dashevsky | H04W 4/00 455/502 |
| 2006/0075348 A1* | 4/2006 | Xu | G06F 3/0481 715/730 |
| 2006/0149850 A1* | 7/2006 | Bowman | G11B 27/10 709/231 |
| 2007/0156805 A1* | 7/2007 | Bristol | H04L 12/581 709/202 |
| 2007/0198738 A1* | 8/2007 | Angiolillo | H04L 12/581 709/231 |
| 2008/0151112 A1* | 6/2008 | Basile | G09G 3/003 348/500 |
| 2008/0291266 A1* | 11/2008 | Burckart | H04N 21/4122 348/21 |

(Continued)

OTHER PUBLICATIONS

Intrasonics, "Automatic Content Recognition", http://www.intrasonics.com/acr.php, Oct. 14, 2011, 2 pages.

(Continued)

*Primary Examiner* — Hung Dang
*Assistant Examiner* — Sunghyoun Park

(57) ABSTRACT

A device may provide a video content item for display and receive a request to share the video content item with another device for a synchronized playing of the video content item by the device and the other device. The device may generate a stream of the video content item based on a point within the video content item currently played by the device and transmit the stream to the other device to synchronize playing of the video content item by the device and the other device. The device may obtain information identifying a particular point within the video content item currently played by the other device, determine a synchronization point, in the video content item, based on the obtained information, and update, based on the synchronization point, to synchronize the stream. The device may transmit the synchronized stream, to the other device, to re-synchronize playing of the video content item.

20 Claims, 14 Drawing Sheets

(56) References Cited

U.S. PATENT DOCUMENTS

| | | | | |
|---|---|---|---|---|
| 2009/0275403 | A1* | 11/2009 | Proctor | A63F 13/12 463/29 |
| 2010/0011292 | A1* | 1/2010 | Marinkovich | G06F 3/0481 715/716 |
| 2012/0082424 | A1* | 4/2012 | Hubner | H04N 21/242 386/219 |
| 2012/0177067 | A1* | 7/2012 | Cho | H04N 21/4126 370/503 |
| 2012/0236842 | A1* | 9/2012 | De Foy | H04L 65/1016 370/350 |
| 2014/0178028 | A1* | 6/2014 | Park | H04W 4/008 386/201 |

OTHER PUBLICATIONS

Gartner, Inc., "Automatic Content Recoginition (ACR)", http://www.gartner.com/it-glossary/automatic-content-recognition-acr/, Nov. 5, 2012, 2 pages.

Michael Wolf, "Three Ways Automatic Content Recognition Will Change TV", http://www.forbes.com/sites/michaelwolf/2013/11/20/three-ways-automatic-content-recognition-will-change-tv/, Nov. 20, 2013, 3 pages.

\* cited by examiner

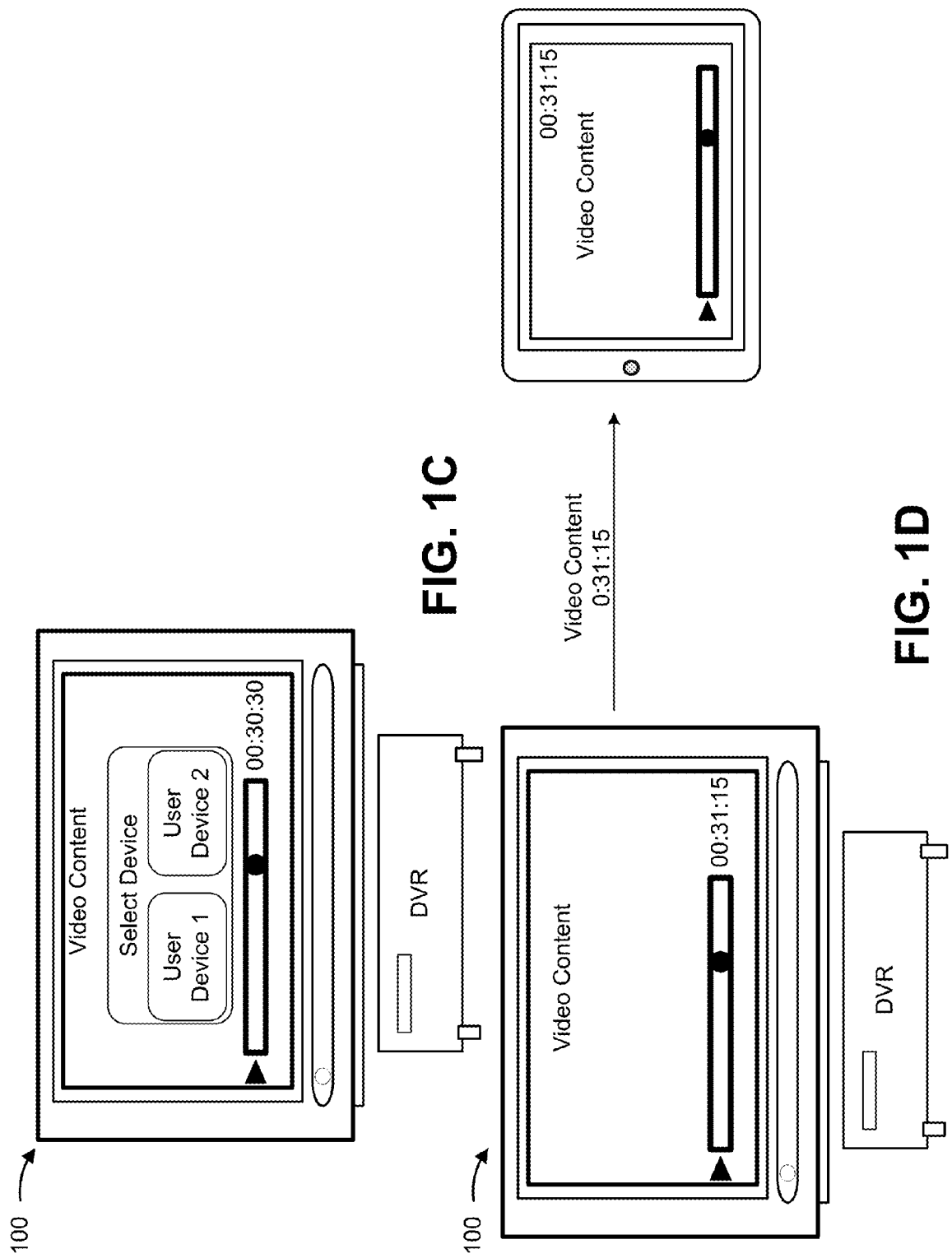

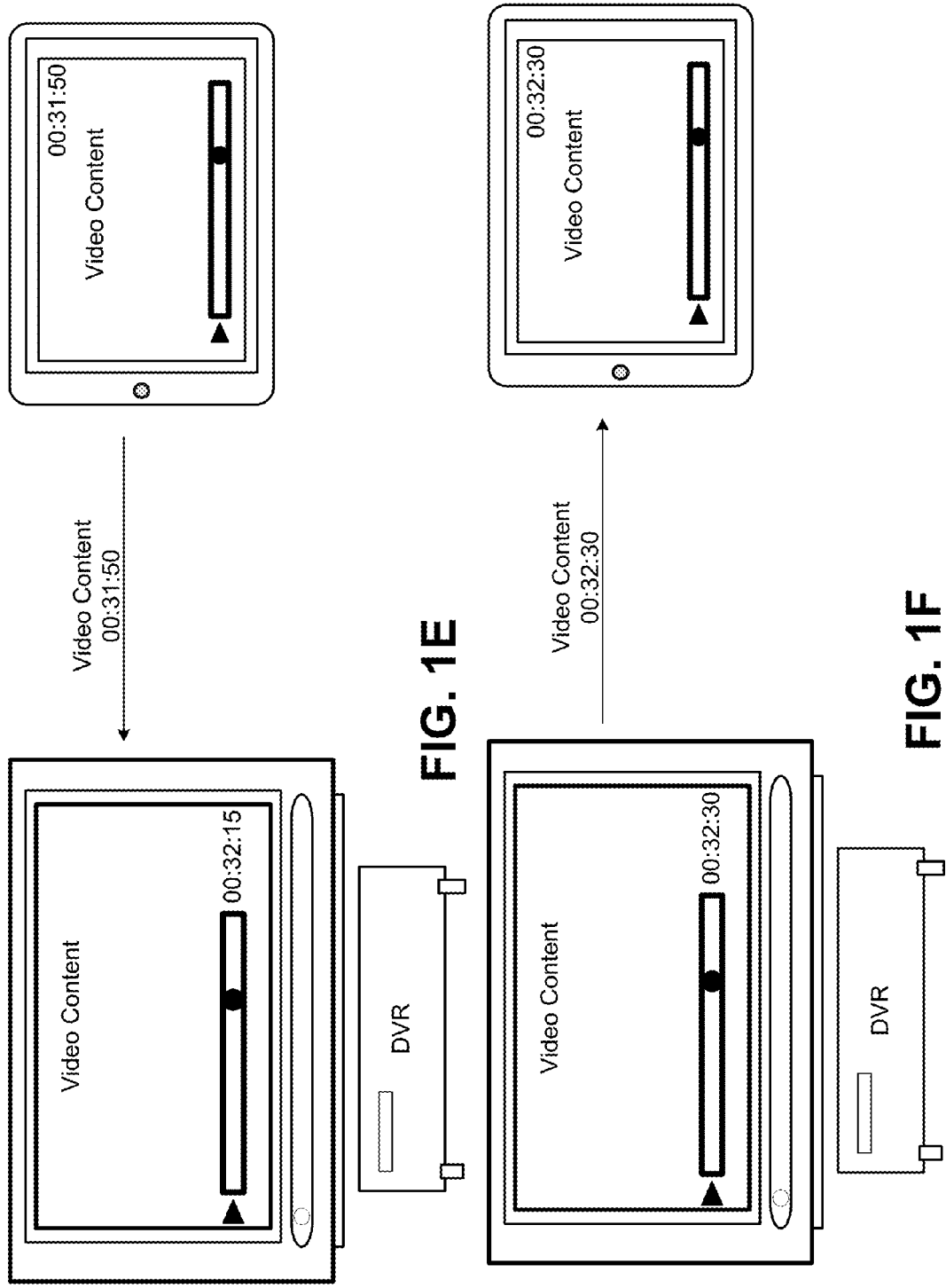

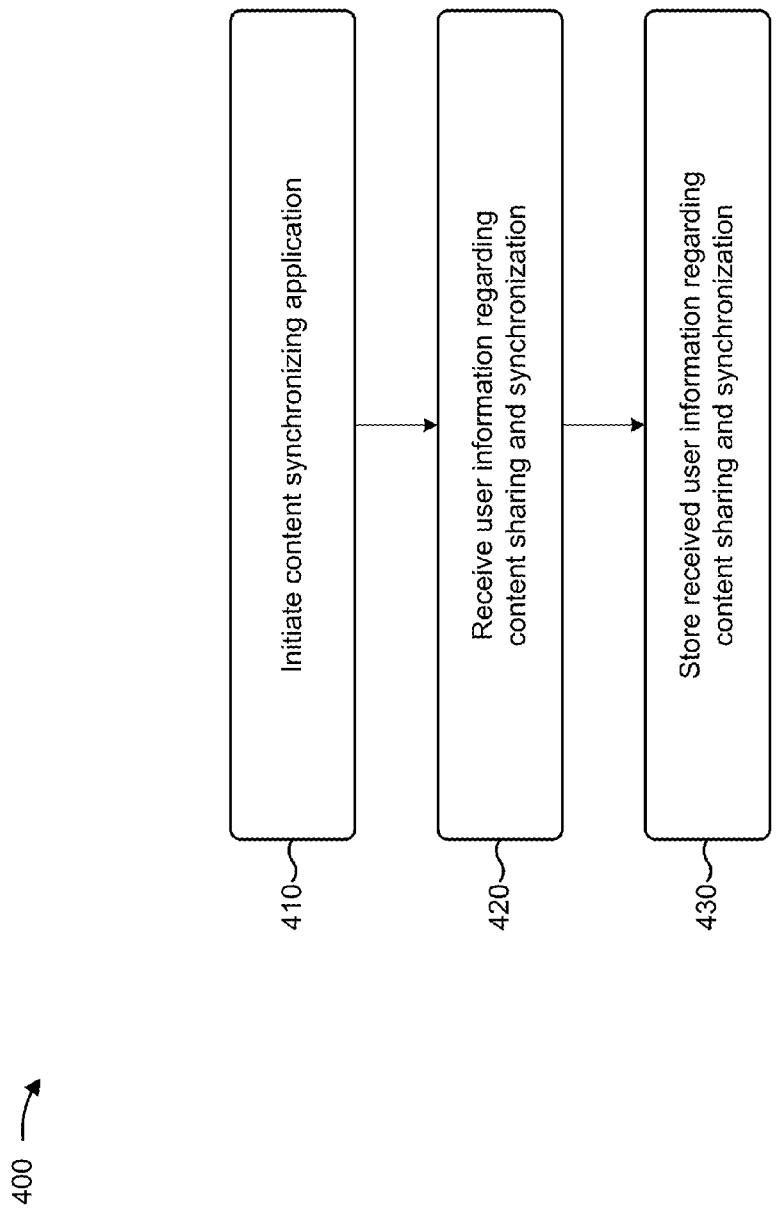

User Information

Content Sharing  ● Opt-In   ○ Opt-Out
Content Sharing Group
  Devices of user
  ☒ Living Room DVR ☒ Basement DVR
  ☐ Bedroom DVR  ☒ Tablet  ☒ Smartphone
  Other device(s)/user(s)
  ☒ Elle's Tablet  ☒ Crew's Device
  ☒ Rhett  ☒ Chris
Additional Device(s)/User(s) [            ]
Authentication Information for Requesting Content
  ☐ password/passcode  [******]
Notifications to be Added to Content Sharing Group
  ● Enable  ○ Disable
Messaging History Viewing
  ☐ Rhett  ☐ Elle's Tablet  ☒ Chris
Frequency For Initiating Synchronization Operation
[Every 2 secs.]

(SUBMIT)

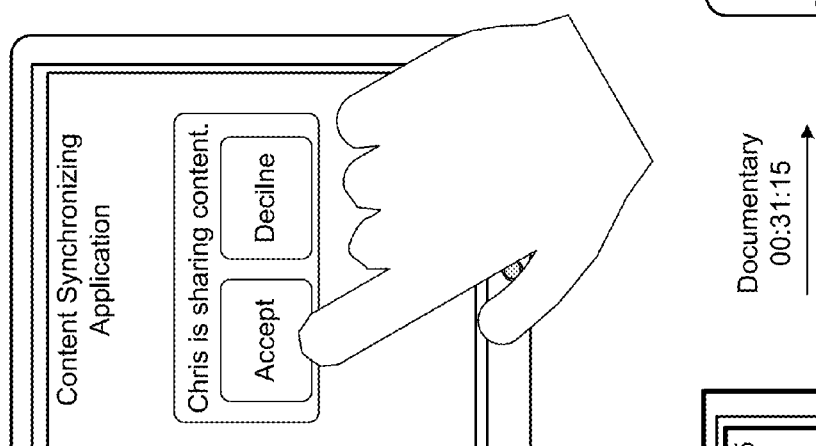
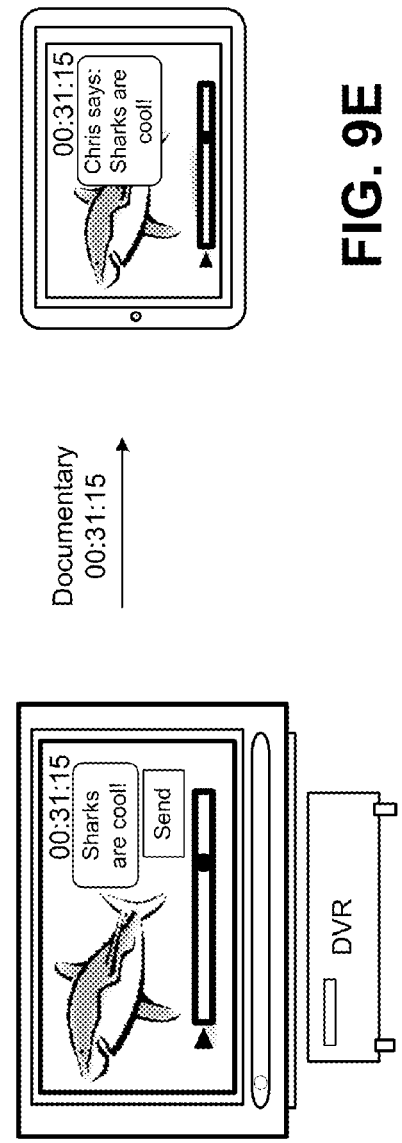

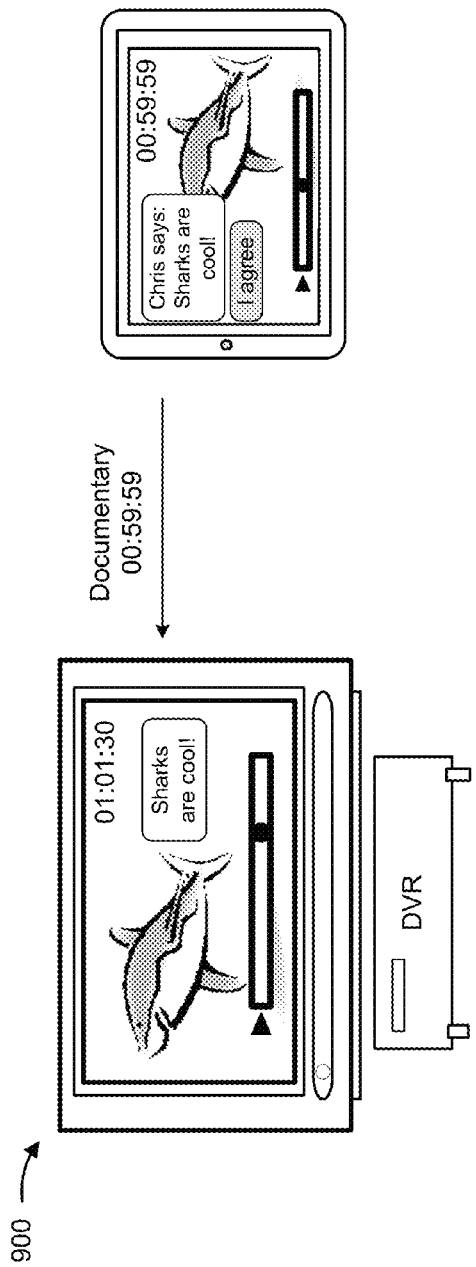
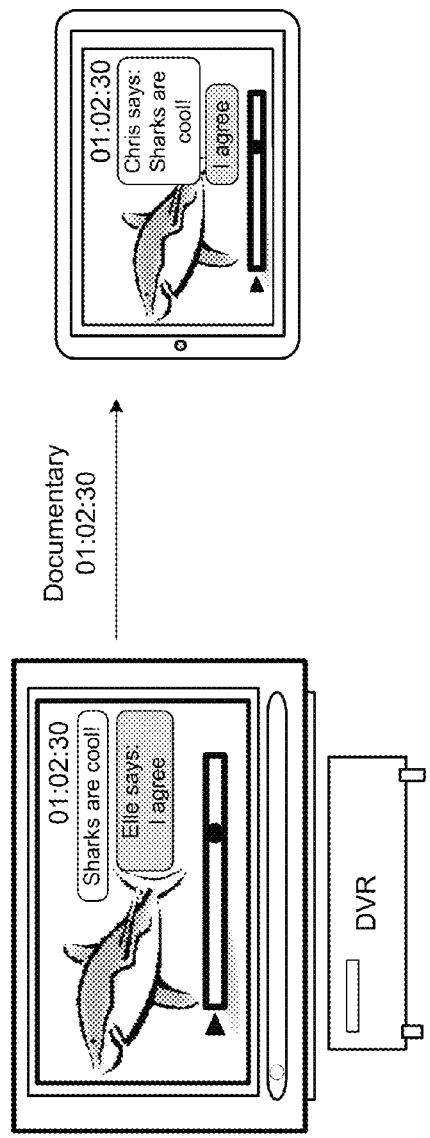
FIG. 9F
FIG. 9G

SHARING AND SYNCHRONIZING CONTENT

BACKGROUND

A device may receive video content from a content provider and provide the video content for display to a user of the device. Additionally, or alternatively, the device may store the video content, and may retrieve and provide the stored video content for display to the user.

BRIEF DESCRIPTION OF DRAWINGS

FIGS. 1A-1F are diagrams of an overview of an implementation described herein;

FIG. 4 is a flow chart of an example process for configuring user information relating to sharing and synchronizing content;

FIG. 5 is a diagram of an example of the process described with regard to FIG. 4;

FIGS. 9A-9G are diagrams of examples of the process described with regard to FIG. 8.

DETAILED DESCRIPTION OF PREFERRED EMBODIMENTS

Figure 1A:
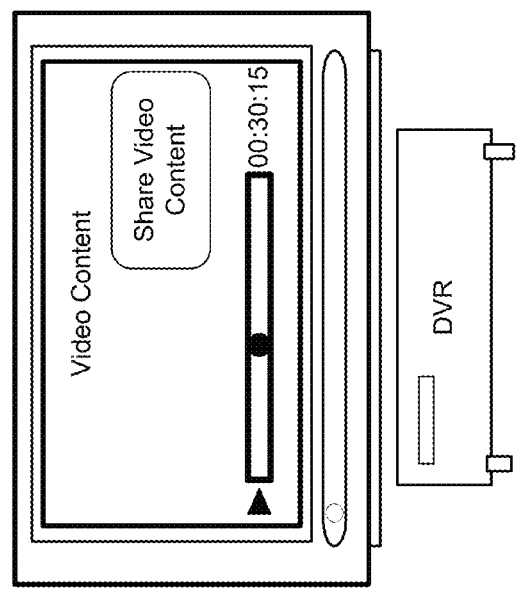
Figure 1B:
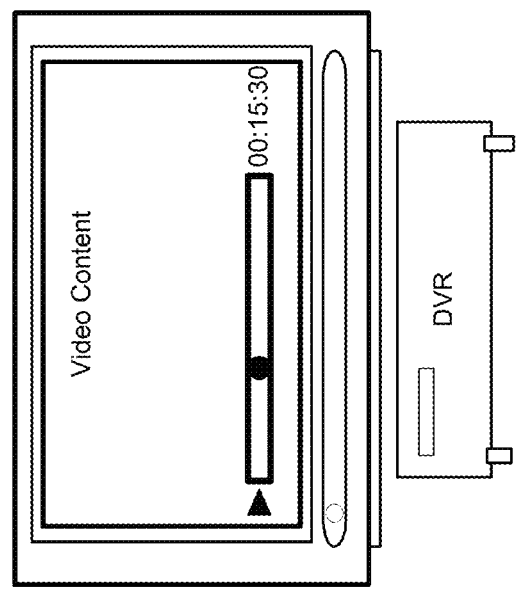

The following detailed description refers to the accompanying drawings. The same reference numbers in different drawings may identify the same or similar elements.

A device may provide a video content item for display to a first user. The first user and/or a second user may desire a synchronized playing of the video content item (e.g., to simulate a viewing experience in which the first user and the second user are at the same location and are watching the same video content). However, multiple actions may be manually performed by the first user and the second user to enable a device of the first user to play the same point, within the video content item, that is being played by the device of the second user to achieve the synchronized viewing experience. For example, the first user and the second user may need to communicate frequently to inform each other of a respective point, within the video content item, that each user is currently viewing. Additionally, each user may be required to perform various actions to find and play the respective point within the video content item. In some instances, these multiple actions may be frequently repeated to account for the playing of the video content item becoming unsynchronized. Accordingly, a synchronized viewing experience of the video content item may be time consuming and may be difficult to achieve, thereby negatively affecting the viewing experience of each user.

Systems and/or methods described herein may facilitate sharing of a video content item between devices and facilitate synchronized playing of the video content item that is provided for output by the devices. As used herein, a video content item may include video content, such as a movie, a television program, a home video, or the like.

FIGS. 1A-1F are diagrams of an overview of an implementation described herein. As shown as an example in FIG. 1A, a media client (e.g., a digital video recorder (DVR)) may provide a video content item (e.g., a recorded video content item) for display to a user via a television. Assume that the media client is executing a content synchronizing application that enables content to be shared with other devices and enables the video content item, provided for display by the other devices, to be synchronized with playing of the video content item by the media client.

Assume that the user desires to share the video content item with another user for a synchronized playing of the video content item and that the user has submitted the request for the synchronized playing of the video content item. As shown as an example in FIG. 1B, the content synchronizing application may cause the media client to provide, for display, information indicating that the video content item is to be shared based on the request.

As shown in FIG. 1C, assume that the user submits an input confirming that the video content item is to be shared and that the content synchronizing application identifies devices with which the video content item may be shared based on the input. As shown as an example in FIG. 1C, the content synchronizing application may cause the media client to provide, for display, information identifying user device 1 and user device 2 with which the video content item may be shared. Assume that the user submits an input selecting user device 1. Further assume that the content synchronizing application identifies a point within the video content item, that is currently being presented for display to the user and that the content synchronizing application causes a stream of the video content item to be generated based on the point within the video content item.

As shown in FIG. 1D, the content synchronizing application may cause the stream of the video content to be transmitted to user device 1 (e.g., a tablet) based on the input selecting user device 1. As further shown in FIG. 1D, the point within the video content, displayed to the first user, may be displayed by the tablet to the second user. Accordingly, the first user and the second user may enjoy a synchronized playing of the video content item.

As shown in FIG. 1E, assume that due to network latency, playing of the video content item, by the tablet, becomes unsynchronized with the playing of the video content item by the media client. As further shown in FIG. 1E, the tablet may transmit, to the media client, information identifying a particular point within the video content item currently being played by the tablet. Assume that the content synchronizing application determines, based on the information identifying the particular point within the video content item, that the playing of the video content item is no longer synchronized.

Further assume that the content synchronizing application identifies a synchronization point, in the video content item, to re-synchronize the playing of the video content item and that the content synchronizing application updates the stream of the video content item based on the synchronization point. As shown in FIG. 1F, the content synchronizing application may cause the updated stream of the video content item to be transmitted to the tablet. As further shown in FIG. 1F, a point within the video content item, currently played by the media client, may be played by the tablet. Accordingly, the user and the other user may continue to enjoy the synchronized playing of the video content item.

Thus, systems and/or methods described herein may synchronize playing of a video content item that is provided for display by different devices. Systems and/or methods described herein may also periodically identify a different synchronization point, during the playing of the video content item, to maintain a synchronized playing of the video content item. Systems and/or methods described herein may also enable messages to be exchanged between users of the different devices and to be displayed during the synchronized playing of the video content item.

While implementations are described herein as relating to video content, systems and/or methods, in other implementations, may relate to synchronized listening of audio content, synchronized viewing of image content, and/or synchronized reading of text content.

Figure 2:
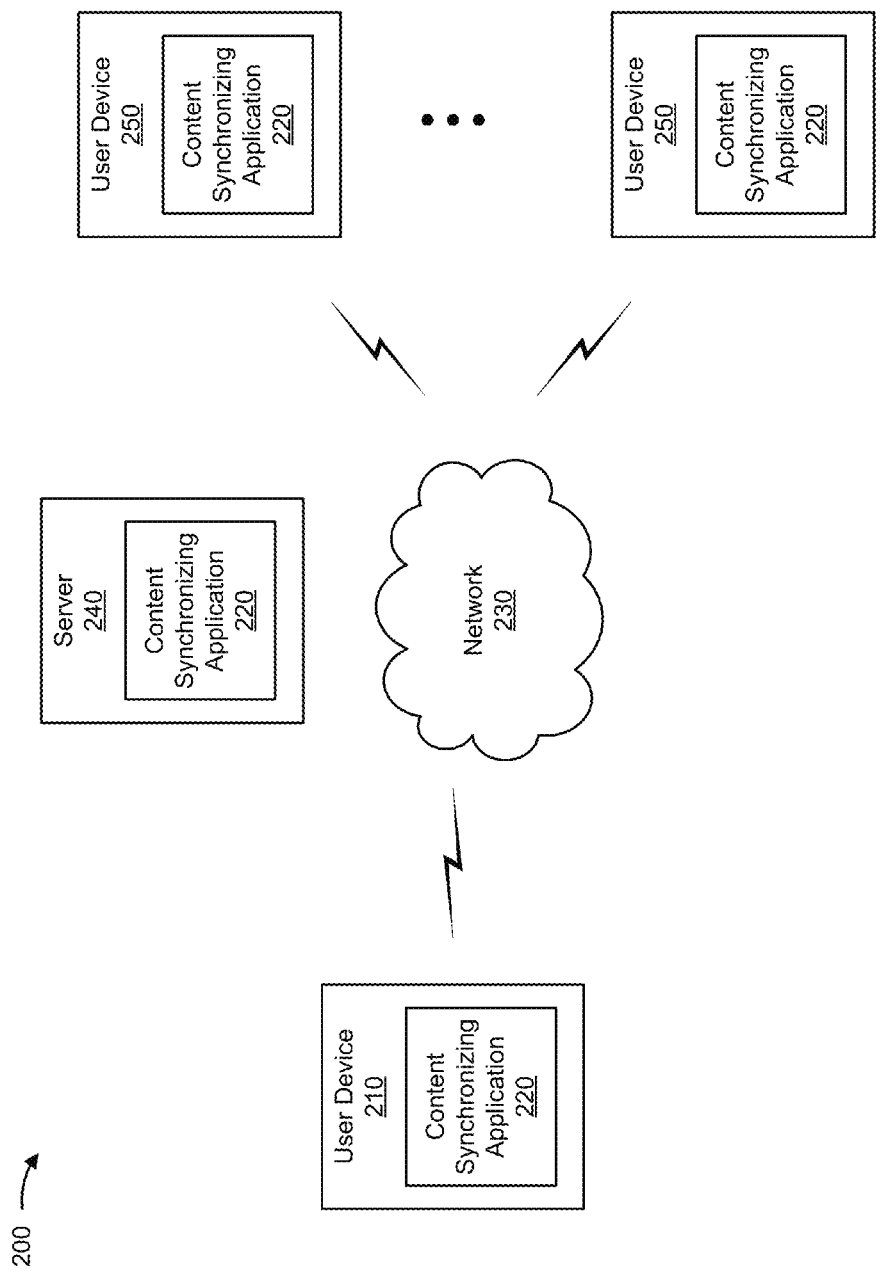
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a content synchronizing application 220, a network 230, a server 240, and user devices 250-1 to 250-N (N≥1) (hereinafter referred to collectively as "user devices 250," and individually as "user device 250"). Devices of environment 200 may interconnect via wired connections, wireless connections, or a combination of wired and wireless connections.

User device 210 may include one or more devices that are capable of receiving content (e.g., video content, audio content, or the like), storing the content, and/or presenting the content to a user (e.g., providing the content for display to the user, for listening by the user, or the like). For example, user device 210 may include a set top box, a DVR, or the like. Alternatively, user device 210 may include a smart phone, a desktop computer, a laptop computer, a tablet computer, a gaming device, a digital video disc (DVD) player, and/or another type of wired or wireless user device. In some implementations, user device 210 may include content synchronizing application 220 that facilitates sharing of a video content item between devices and facilitates synchronized playing of the video content item by the devices. For example, user device 210 may be preloaded with and/or may download content synchronizing application 220.

Network 230 may include one or more wired and/or wireless networks. For example, network 230 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a television network, a satellite network, a cloud computing network, and/or a combination of these or other types of networks.

Server 240 may include a server device or a collection of server devices capable of storing and/or hosting content (e.g., video content, audio content, image content, or the like) and transmitting the content to devices (e.g., user device 210 and/or one or more user devices 250). In some implementations, server 240 may include content synchronizing application 220 to facilitate sharing of a video content item between devices (e.g., user device 210 and/or one or more user devices 250) and to facilitate synchronized playing of the video content item by the devices. In some implementations, server 240 may store information regarding users of the devices. For example, server 240 may store user information regarding content sharing and synchronization (e.g., including information identifying a frequency for initiating a synchronization operation, information identifying services subscribed to by the users, information regarding network connection speed associated with devices of the users, information regarding network latency associated with the devices, information regarding capabilities associated with the devices, or the like). The device capabilities may include capabilities relating to processing content, such as an amount of resources for processing content, processing speed for processing content, or the like. As used herein, a synchronization operation may cause playing of a video content item, by multiple devices, to be synchronized.

User device 250 may include one or more devices similar to user device 210. For example, user device 210 may include a smart phone, a desktop computer, a laptop computer, a tablet computer, a gaming device, a DVD player, and/or another type of wired or wireless user device. Alternatively, user device 210 may include a set top box, a DVR, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
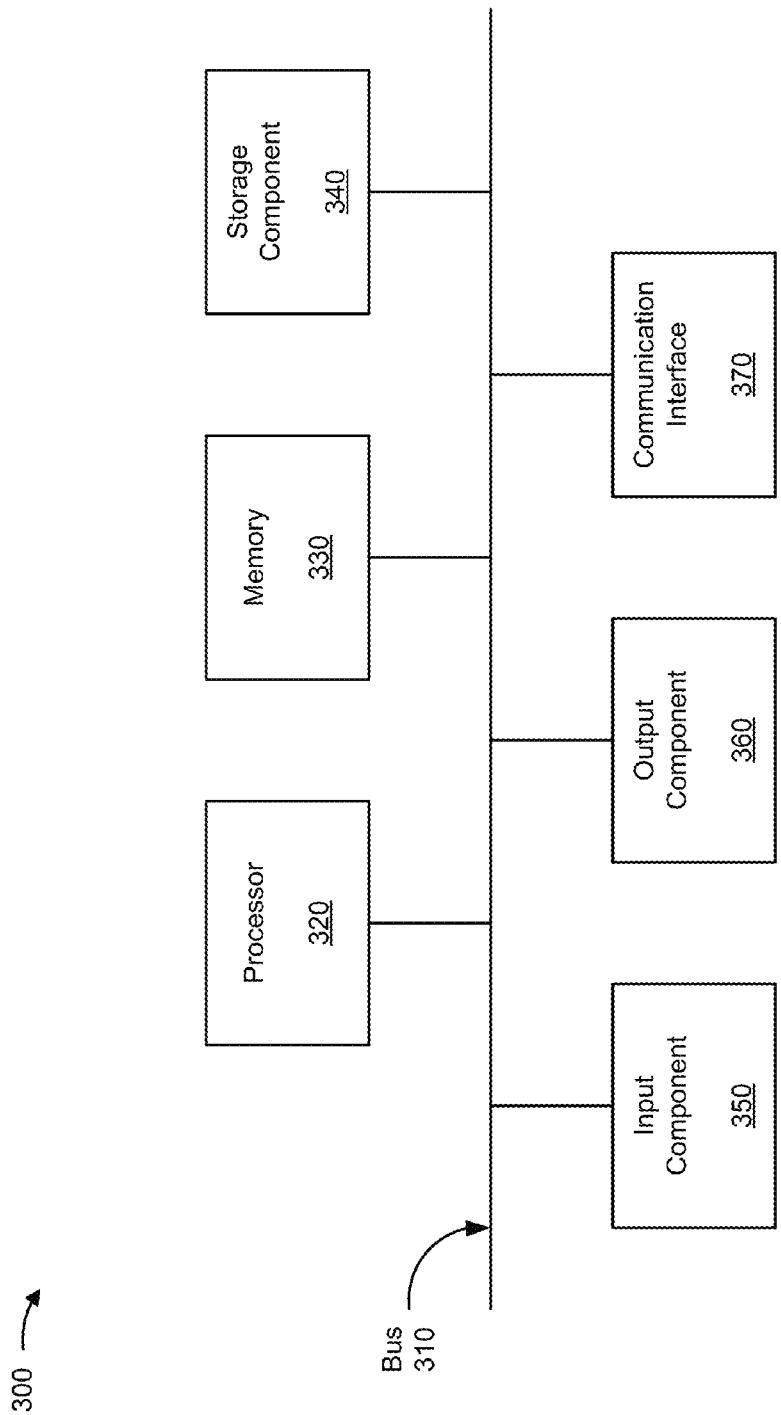
FIG. 3 is a diagram of example components of one or more devices of FIG. 2.

FIG. 3 is a diagram of example components of a device 300. Device 300 may correspond to user device 210, server 240, and/or a user device 250. Additionally, or alternatively, each of user device 210, server 240, and/or a user device 250 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for configuring user information relating to sharing and synchronizing content. In some implementations, one or more process blocks of FIG. 4 may be performed by user device 210. Additionally, or alternatively, one or more process blocks of FIG. 4 may be performed by another device or a group of devices separate from or including user device 210, such as server 240 and/or user device 250.

As shown in FIG. 4, process 400 may include initiating a content synchronizing application (block 410). For example, user device 210 may receive a request (e.g., from a user of user device 210) to initiate content synchronizing application 220 and may cause content synchronizing application 220 to be initiated based on the request. In some implementations, user device 210 may cause content synchronizing application 220 to be initiated automatically (e.g., without user request or input). For example, user device 210 may cause content synchronizing application 220 to be initiated upon user device 210 powering on, booting up, or the like.

As further shown in FIG. 4, process 400 may include receiving user information regarding content sharing and synchronization (block 420). For example, after initiating content synchronizing application 220, user device 210 may receive user information regarding content sharing and synchronization, submitted by the user, via a user interface of content synchronizing application 220. In some implementations, content synchronizing application 220 may cause the user to be authenticated before enabling the user to submit the user information. For example, content synchronizing application 220 may authenticate the user based on a username and a password submitted by the user.

In some implementations, the user information may include information indicating whether the user has opted-in with respect to sharing content. For example, by opting-in, the user may enable a video content item to be shared between user device 210 and another device. Accordingly, playing of the video content item, by user device 210 and the other device, may be synchronized.

Additionally, or alternatively, the user information may include information identifying a content sharing group of the user. As used herein, a content sharing group may identify one or more devices and/or one or more users with which a device may share content.

In some implementations, the information identifying the content sharing group may include information identifying devices and/or information identifying particular users with which user device 210 may share content. For example, user device 210 may receive content sharing requests from and/or may transmit content sharing requests to the devices and/or particular devices of the particular users. In some implementations, the devices may include one or more devices of the user. In some implementations, the information identifying the devices may include a name of a device (e.g., "Living Room TV" or "Tablet"), a network address of the device, and/or any other type of device identifier. The network address may include an Internet protocol (IP) address, a media access control (MAC) address, or the like. In some implementations, the information identifying the users may include an e-mail address, a user identifier, a social network identifier, or the like. In some implementations, the users may be identified as contacts of the user and/or members of a social network of the user.

In some implementations, content synchronizing application 220 may automatically identify the devices. For example, content synchronizing application 220 may identify particular devices associated with a network with which user device 210 is associated and identify the particular devices as the devices via which content may be shared.

Additionally, or alternatively, the user information may include information indicating that content sharing is to be requested (by users and/or devices) using authentication information. In some implementations, the authentication information may include a password, a passcode, a username, or the like. Additionally, or alternatively, the user information may include information indicating that the user is enabling receipt of notifications (from other users and/or other devices) to be added to the content sharing group of the user. In some implementations, the notifications may be received via e-mail, text messaging, or the like.

Additionally, or alternatively, the user information may include information identifying a frequency for initiating a synchronization operation. The synchronization operation may cause playing of a video content item, by multiple devices (e.g., user device 210 and another device), to be synchronized. For example, the information identifying the frequency may indicate that the synchronization operation is to be initiated every second, every ten seconds, every thirty seconds, every minute, or the like. However, it may be apparent that, for an enhanced viewing experience, the synchronization operation should be initiated more frequently (e.g., more frequently than a frequency threshold). In some implementations, the synchronization operation may be performed based on information identifying a particular point within the video content item that is currently being played by user device 210 and/or played by the other device. For example, based on the frequency, content synchronizing application 220 may periodically transmit to the other device and/or receive from the other device the information identifying the particular point.

Additionally, or alternatively, the user information may include messaging history information. In some implementations, the messaging history information may include information identifying one or more users and/or devices that are allowed to access messages exchanged between the user and other users during a previous synchronized playing of a video content item. Additionally, or alternatively, the messaging history information may include information identifying a period of time for storing the messages. For example, the messaging history information may indicate that the messages are to be stored for one or more days, one or more weeks, one or more months, or the like. In some implementations, the messaging history information may identify a respective user (or a respective group of users) for messages exchanged during a previous synchronized playing of different content items. For example, the messaging history information may identify a first user for a first content item and may identify a second user for a second content item.

Additionally, or alternatively, the user information may include a preference of the user relating to enabling playing of a video content item, by a device of the user (e.g., user device 210), to be suspended (e.g., paused) and/or to be played at a particular speed (e.g., slower than or faster than a threshold speed) to account for a delay (e.g., network latency) experienced by another user device that is playing the video content item.

As further shown in FIG. 4, process 400 may include storing the received user information regarding content sharing and synchronization (block 430). For example, user device 210 may store the user information in a memory associated with user device 210. In some implementations, user device 210 may transmit to the user information to server 240 for storage. Additionally, or alternatively, user device 210 may transmit the user information to one or more other user devices of the user, such as one or more user devices 250, for storage in a memory associated with the one or more other user devices.

In some implementations, the user may modify the user information to customize the user information for user device 210 and/or each of the one or more user devices 250. For example, the user may modify the frequency (e.g., based on a network connection speed, network latency, or the like), modify the messaging history information, modify the content sharing group, or the like. In some implementations, user device 210 may automatically modify the user information.

In some implementations, one or more process blocks of FIG. 4 may be performed by a device, separate from user device 210, that does not include content synchronizing application 220. In such an instance, the user may submit a request (e.g., to user device 210 and/or server 240) indicating a desire to submit the user information via the device. Based on the request, user device 210 and/or server 240 may provide a user interface to the device and the user may submit, via the user interface, the user information to user device 210 and/or server 240 for storage.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram of an example 500 of process 400 described above with respect to FIG. 4. In example 500, assume that a user, associated with user device 210 (e.g., a DVR), has initiated content synchronizing application 220 and desires to submit user information regarding content sharing and synchronization. Further assume that the user has been authenticated by content synchronizing application 220.

As shown in relation to FIG. 5, content synchronizing application 220 may cause user device 210 to provide a user interface, via a display (e.g., a television), that allows the user to submit the user information. For example, as shown in relation to FIG. 5, the user interface may allow the user to indicate whether the user desires to opt-in or opt-out of sharing content. For example, by opting-in, the user may enable a video content item to be shared between user device 210 and another device. Accordingly, playing of the video content item, by user device 210 and the other device, may be synchronized. By opting-out, a video content item may not be shared between user device 210 and the other device.

As further shown in FIG. 5, the user interface may allow the user to identify a content sharing group of the user. As explained above, the content sharing group may identify devices and/or users with which user device 210 may share content. As shown as an example in FIG. 5, the content sharing group may include devices of the user, such as Living Room DVR, Basement DVR, Tablet, and Smartphone. As further shown as an example in FIG. 5, the content sharing group may include other device(s) and/or user(s), such as Elle's Tablet, Crew's Device, Rhett, and Chris.

As further shown in FIG. 5, the user interface may allow the user to identify authentication information that is to be used to request content from user device 210. As further shown as an example in FIG. 5, the user may identify a particular password.

As further shown in FIG. 5, the user interface may allow the user to enable or disable receiving notifications to be added to the content sharing group. As further shown as an example in FIG. 5, the user may enable receiving the notifications. Accordingly, the user may receive notifications, from other users and/or other devices, to be added to the content sharing group. As explained above, the notifications may be received via e-mail, text messaging, or the like.

As further shown in FIG. 5, the user interface may allow the user to identify messaging history information. As explained above, the messaging history information may identify one or more users and/or devices that are allowed to access messages exchanged between the user and other users during a previous synchronized playing of a video content item. As further shown as an example in relation to FIG. 5, the messaging history information may identify Chris as a user that is allowed to access the messages.

As further shown in relation to FIG. 5, the user interface may allow the user to identify a frequency for initiating a synchronization operation that synchronizes playing of a video content item. As further shown as an example in FIG. 5, the user may indicate that the synchronization operation is to be initiated every 2 seconds. Accordingly, content synchronizing application 220 may cause the synchronization operation to be initiated every 2 seconds to synchronize playing of a video content item by user device 210 and another device.

As further shown in relation to FIG. 5, the user interface may allow the user to select a "SUBMIT" option to cause the user information to be stored in a memory associated with user device 210, associated with one or more other devices of the user (e.g., one or more user devices 250), and/or associated with server 240.

As indicated above, FIG. 5 is provided merely as an example. Other examples are possible and may differ from what was described with regard to FIG. 5.

Figure 6:
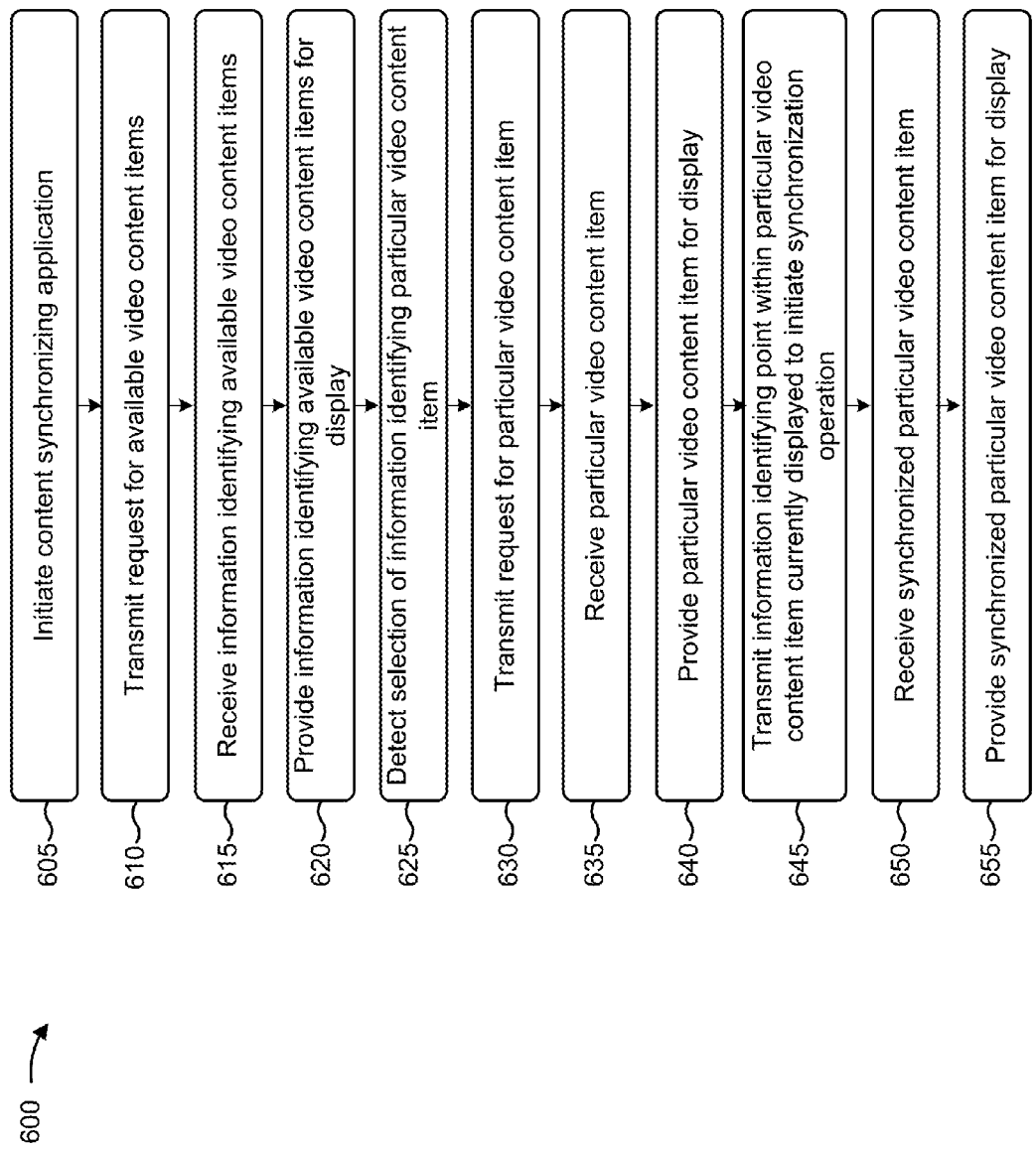
FIG. 6 is a flow chart of an example process for requesting and receiving synchronized content.

FIG. 6 is a flowchart of an example process for requesting and receiving synchronized content. In some implementations, one or more process blocks of FIG. 6 may be performed by user device 210. In some implementations, one or more process blocks of FIG. 6 may be performed by another device or a group of devices separate from or including user device 210, such as server 240 and/or one or more user devices 250.

As shown in FIG. 6, process 600 may include initiating a content synchronizing application (block 605). For example, user device 210 may receive a request (e.g., from a user of user device 210) to initiate content synchronizing application 220 and may cause content synchronizing application 220 to be initiated based on the request.

As further shown in FIG. 6, process 600 may include transmitting a request for available video content items (block 610). For example, content synchronizing application 220 may cause user device 210 to transmit a request for available video content items (e.g., movies, television programs, or the like) to content sharing devices. In some implementations, content synchronizing application 220 may cause the user to be authenticated, in a manner similar to that described above with respect to block 420, before transmitting the request. In some implementations, content synchronizing application 220 may cause user device 210 to transmit the request based on input from the user. For example, the user may submit an input requesting the available video content items and/or a specific video content item. In some implementations, content synchronizing application 220 may cause user device 210 to transmit the request without the input from the user (e.g., upon content synchronizing application 220 being initiated, upon user device 210 powering on, upon user device 210 booting up, or the like).

In some implementations, content sharing devices may include particular devices included in a content sharing group of the user (e.g., devices and/or users with which user device 210 may share content). For example, content synchronizing application 220 may identify the content sharing group based on user information, of the user, regarding content sharing and synchronization. Additionally, or alternatively, content sharing devices may include server 240.

In some implementations, the request may cause the content sharing devices to identify video content items being provided for display by and/or stored (and not being provided for display) by the content sharing devices and to transmit information identifying the video content items. The video content items may include recorded video content items and/or non-recorded video content items. In some implementations, the request may be transmitted to a particular content sharing device and may cause the particular content sharing device to identify video content items stored by and/or provided for display by the particular content sharing device (and/or by another one or more of the content sharing devices) and may cause the particular content sharing device to transmit information identifying the video content items. For example, the request may be transmitted to server 240 and may cause server 240 to identify video content items stored by and/or provided for display by one or more user devices 250 and/or server 240.

As further shown in FIG. 6, process 600 may include receiving information identifying available video content items (block 615). For example, content synchronizing application 220 may receive the information identifying the available video content items, from the content sharing devices, based on transmitting the request.

As further shown in FIG. 6, process 600 may include providing information identifying available video content items for display (block 620). For example, content synchronizing application 220 may cause user device 210 to provide the information identifying the available video content items for display after receiving the information identifying the available video content items. In some implementations, the information identifying the available video content items may include information identifying a respective content sharing device, of the content sharing devices, that stores a respective video content item of the available video content items.

As further shown in FIG. 6, process 600 may include detecting a selection of information identifying a particular video content item (block 625). For example, content synchronizing application 220 may detect a selection, by the user, of information identifying a particular video content item (e.g., a particular movie or a particular television program) from the information identifying the available video content items. In some implementations, the user may select the particular video content item for a synchronized playing, of the particular video content item, by user device 210 and one or more devices of one or more other users.

As further shown in FIG. 6, process 600 may include transmitting a request for the particular video content item (block 630). For example, content synchronizing application 220 may cause user device 210 to transmit a request for the particular video content item based on detecting the selection of the information identifying the particular video content item. In some implementations, the request may include the information identifying the particular video content item, user identification information, and information identifying a respective content sharing device that stores the particular video content item and/or that is providing the particular video content item for display. The user identification information may include information identifying the user, information identifying user device 210 (e.g., a network address), and/or authentication information associated with requesting the particular video content item from the respective content sharing device. In some implementations, the request may be transmitted to the respective content sharing device, and the request may cause the respective content sharing device to determine whether the user is authorized to receive the particular video content item (e.g., based on the user identification information). If the user is authorized to receive the particular video content item, the respective content sharing device may generate and transmit a stream of the particular video content item to user device 210 (e.g., based on the information identifying the particular video content item and the user identification information). In some implementations, the particular video content item may be recorded video content or non-recorded ("live") video content.

In some implementations, if the particular video content item is currently being played by the respective content sharing device, the stream may be generated from a point within the particular video content item that is currently being played. Alternatively, if the particular video content item is not currently being played but has previously been played by the respective content sharing device, the stream may be generated from a point within the particular video content item corresponding to a point within the particular video content item that was last played. Alternatively, if the particular video content item is not currently being played, the stream may be generated from a beginning point of the particular video content item. In some implementations, the stream may be generated from a particular point, within the particular video content item, identified by the user via the request.

In some implementations, the user may be associated with the respective content sharing device. In some implementations, the one or more other users (with which playing of the particular video content item is to be synchronized) may include a first user associated with the respective content sharing device and/or a second user associated with another device (e.g., a user device 250).

As further shown in FIG. 6, process 600 may include receiving the particular video content item (block 635). For example, user device 250 may receive the stream of the particular video content item generated based on the request for the particular video content item. In some implementations, user device 250 may receive the stream of the particular video content item as a secure stream of content. In some implementations, the stream of the particular video content item may be transmitted to the one or more devices of the one or more other users.

As further shown in FIG. 6, process 600 may include providing the particular video content item for display (block 640). For example, content synchronizing application 220 may cause user device 250 to provide the stream of the particular video content item for display to the user. In some implementations, the stream of the particular video content item may also be provided for display to the one or more other users for the synchronized playing of the particular video content item.

As further shown in FIG. 6, process 600 may include transmitting information identifying a point within the particular video content item currently played to initiate a synchronization operation (block 645). For example, after providing the stream of the particular video content item for display, content synchronizing application 220 may cause user device 210 to transmit, to the respective content sharing device, information identifying a point within the particular video content item currently played (e.g., displayed to the user). In some implementations, the information identifying the point within the particular video content item may include a timestamp of the point within the particular video content item. The timestamp may be defined in terms hour, minute, and/or second. Additionally, or alternatively, the information identifying the point within the particular video content item may include information identifying a video frame of the particular video content item corresponding to the point within the particular video content item.

In some implementations, content synchronizing application 220 may transmit the information identifying the point within the particular video content item to cause the respective content sharing device to initiate a synchronization operation. For example, the respective content sharing device may determine whether playing of the particular video content item, by user device 210 and other devices (e.g., the respective content sharing device and/or the one or more devices), is synchronized. For example, the respective content sharing device may compare the information identifying the point within the particular video content item with information identifying a respective point within the particular video content item displayed by the other devices. As a result of the comparison, the respective content sharing device may identify a synchronization point in the particular video content item and update the stream based on the synchronization point (e.g., to generate a synchronized stream of the particular video content item from the synchronization point).

In some implementations, the synchronization operation may be performed based on an amount of time by which playing of the particular video content item, by user device 210 and the other devices, is not synchronized. For example, the synchronization operation may be performed when the amount of time meets and/or exceeds a threshold amount of time (e.g., 5 seconds, 10 seconds, 30 seconds, etc.).

In some implementations, as a result of the comparison, the respective content sharing device may cause playing of the particular video content item to be suspended (e.g., paused), to be slowed down, or to be sped up. For example, the respective content sharing device may determine, based on the comparison, that user device 210 is experiencing network latency. Accordingly, the respective content sharing device may cause the playing of the particular video content item, by the other devices, to be suspended for a period of time (e.g., based on the network latency) and to resume thereafter, to be slowed down for the period of time and to resume playing at a speed prior to being slowed down, or to be sped up for the period of time and to resume playing at a speed prior to being sped up.

As further shown in FIG. 6, process 600 may include receiving the synchronized particular video content item (block 650). For example, user device 210 may receive the synchronized stream of the particular video content item generated based on transmitting the information identifying the point within the particular video content item. In some implementations, user device 210 may receive an instruction relating to playing the stream of the particular video content item for display (e.g., instead of receiving the synchronized stream of the particular video content item). For example, user device 210 may receive, from the respective content sharing device, an instruction to speed up playing of the particular video content item by a first factor (e.g., by a first amount of times) to obtain the synchronized stream of the particular video content item. Additionally, or alternatively, user device 210 may receive, from the respective content sharing device, an instruction to slow down playing of the particular video content item by a second factor (e.g., by a second amount of times) to obtain the synchronized stream of the particular video content item. Additionally, or alternatively, user device 210 may receive, from the respective content sharing device, an instruction to suspend playing of the particular video content item for a particular period of time to obtain the synchronized stream of the particular video content item.

As further shown in FIG. 6, process 600 may include providing the synchronized particular video content item for display (block 655). For example, content synchronizing application 220 may cause user device 250 to provide the synchronized stream of the particular video content item for display to the user. In some implementations, the synchronized stream of the particular video content item may also be transmitted to and provided for display by the one or more devices to maintain the synchronized playing of the particular video content item.

In some implementations, content synchronizing application 220 may identify, in the user information, a frequency for initiating the synchronization operation and may cause blocks 645, 650, and 655 to be periodically repeated based on the frequency, thereby maintaining the synchronized playing of the particular video content item. For example, content synchronizing application 220 may cause user device 210 to periodically transmit information identifying a particular point within the particular video content item based on the frequency. In some implementations, content synchronizing application 220 may determine the frequency independently of the user information of the user. For example, content synchronizing application 220 may obtain (e.g., from server 240) information regarding network connection speed, network latency, and/or capabilities (e.g., relating to processing video content) associated with user device 210, associated with the respective content sharing device, and/or associated with the one or more other devices and may determine the frequency based on the obtained information. Additionally, or alternatively, content synchronizing application 220 may determine the frequency based on a particular frequency identified a threshold number of times in a memory associated with server 240 and/or based on an average of frequencies identified in the memory.

In some implementations, content synchronizing application 220 may receive an indication, from content synchronizing application 220 of the other devices, that the first user and/or the second user has submitted an input to suspend playing of the particular video content item. Accordingly, content synchronizing application 220 may cause user device 210 to suspend playing of the particular video content item by user device 210. Similarly, content synchronizing application 220 may transmit an indication, to content synchronizing application 220 of the other devices, that the user has submitted an input to suspend playing of the particular video content item.

In some implementations, content synchronizing application 220 may provide a user interface, during the synchronized playing of the particular video content item, to enable the user to transmit messages (e.g., instant messages) to and receive messages (e.g., instant messages) from the one or more other users. For example, content synchronizing application 220 may transmit the messages to and receive the messages from content synchronizing application 220 of the other devices. Accordingly, content synchronizing application 220 may enable real-time or near real-time conversations between the user and the one or more other users during the synchronized playing of the particular video content item.

In some implementations, content synchronizing application 220 may cause the messages to be stored in a memory (e.g., a memory associated with user device 210, a memory associated with server 240, and/or a memory associated with the respective content sharing device). In some implementations, content synchronizing application 220 may cause the messages to be stored with information identifying particular points (e.g., timestamps, information identifying particular video frames of the particular video content item, or the like) within the particular video content item, at which the messages were displayed. Accordingly, content synchronizing application 220 may cause the messages to be retrieved from the memory and displayed by user device 210 at the particular points during subsequent playing of the particular video content item. In some implementations, content synchronizing application 220 may cause the messages to be stored for a period of time identified by the user and/or identified by the one or more other users. Additionally, or alternatively, content synchronizing application 220 may automatically identify the period of time based on an amount of storage space available on the memory, an average period of time for storing messages, or the like.

As explained above, in some implementations, the respective content sharing device may include a user device 250. For example, the user device 250 may generate the stream of the particular video content item and transmit the stream to user device 210 and/or the other devices, may perform the synchronization operation to obtain the synchronized stream of the particular content item and transmit the synchronized stream to user device 210 and/or the other devices. Alternatively, the respective content sharing device may include server 240. For example, server 240 may perform the functions of the respective content sharing as described above with respect to the user device 250.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
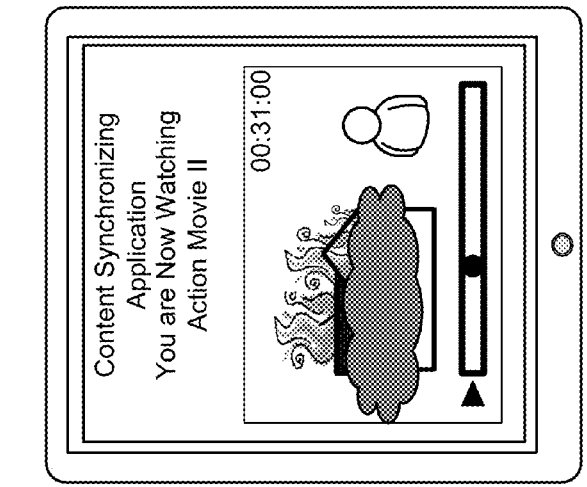
FIGS. 7A-7E are diagrams of examples of the process described with regard to FIG. 6.

FIGS. 7A-7E are diagrams of an example implementation 700 relating to example process 600 shown in FIG. 6. FIGS. 7A-7E show an example of requesting and receiving synchronized content. For the purposes of example 700, assume that a user (e.g., Chris) is watching Action Movie II, with his wife, on a device (e.g., Living Room DVR) in their living room and that Chris has to leave the living room. Further assume that Chris desires a synchronized playing of Action Movie II with his wife after leaving the living room and that Chris has initiated content synchronizing application 220 on user device 210 (e.g., a tablet) to initiate the synchronized playing. Further assume that Chris has been authenticated by content synchronizing application 220 and that Chris has transmitted a request for available video content items in his content sharing group. Further assume that content synchronizing application 220 has transmitted the request to devices in the content sharing group and received information identifying the available video content items from the devices. As shown as an example in FIG. 7A, content synchronizing application 220 may provide, for display, the information identifying each of the available video content items and information identifying a device that is playing and/or is storing the available video content item. As shown in FIG. 7A, assume that Chris selects Action Movie II which is being played by Living Room DVR. Assume that server 240 stores a copy of Action Movie II.

Figure 7B:
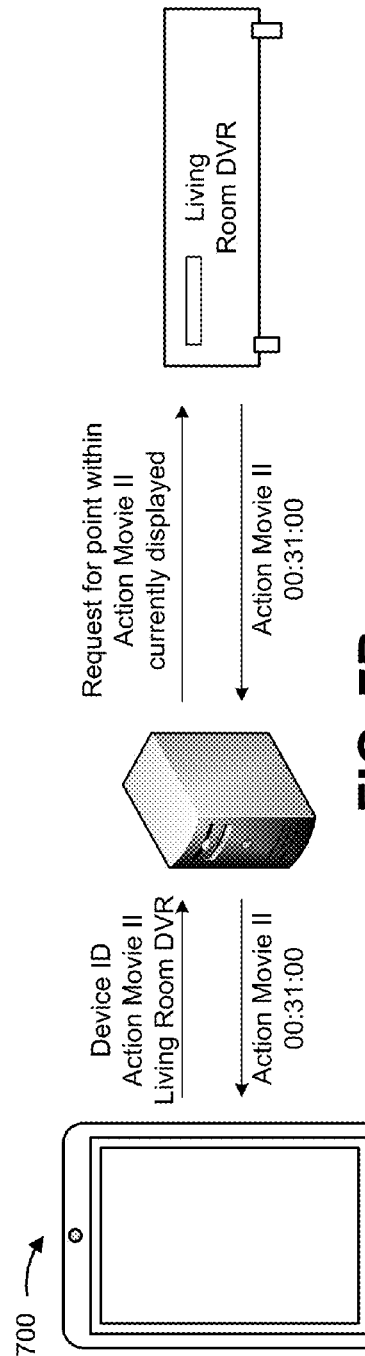
Figure 7C:
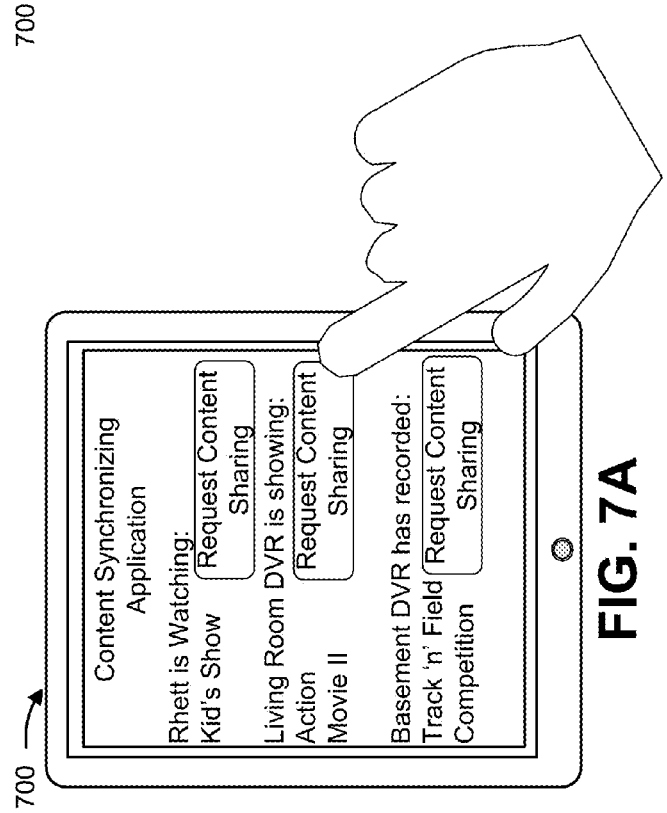

As shown in FIG. 7B, content synchronizing application 220 may transmit a request for Action Movie II to server 240. As shown as an example in FIG. 7B, the request may include information identifying the tablet, information identifying Action Movie II, and information identifying Living Room DVR. As further shown as an example in FIG. 7B, server 240 may transmit a request for information identifying a point within Action Movie II currently played by Living Room DVR and may receive information identifying a timestamp corresponding to the point within Action Movie II from Living Room DVR (e.g., via content synchronizing application 220 of Living Room DVR). As further shown in FIG. 7B, server 240 may generate a stream of Action Movie II based on the point within Action Movie II and may transmit the stream to the tablet. As show in FIG. 7C, the point within Action Movie II, currently played by Living Room DVR, may be played by the tablet, thereby synchronizing the playing of Action Movie II by Chris' tablet and Living Room DVR.

Figure 7D:
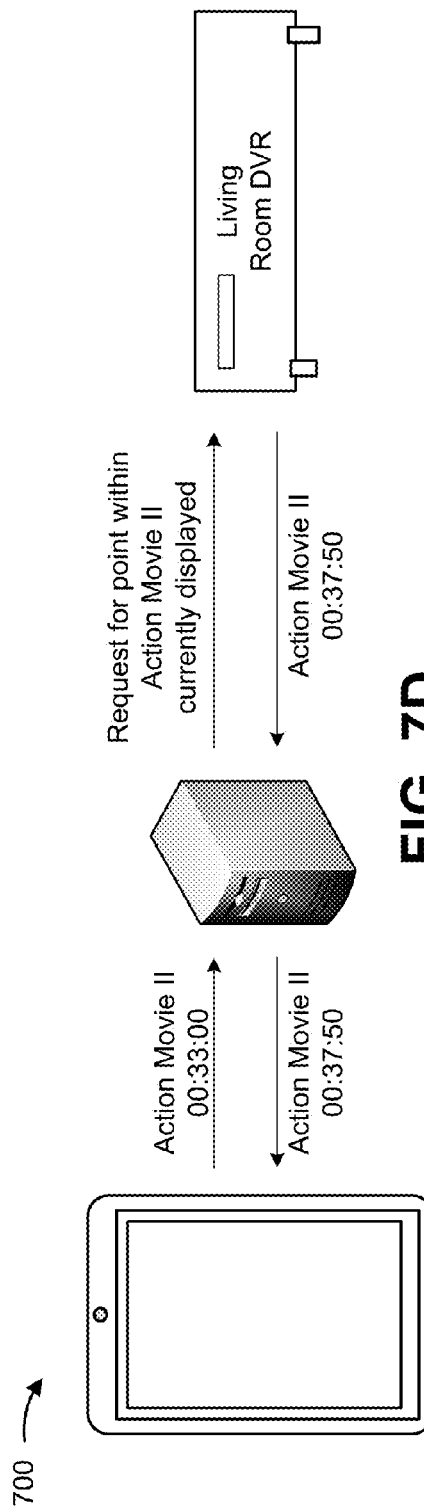
Figure 7E:
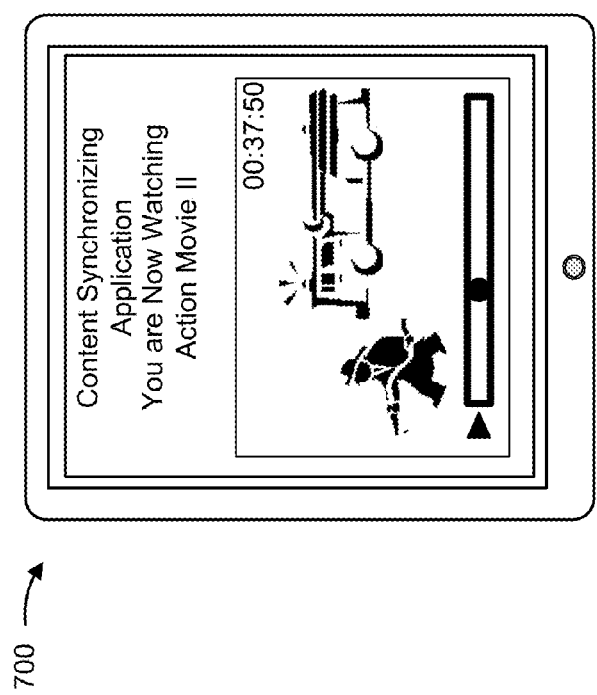

For the purposes of example 700, assume that, due to a poor network connection, the playing of Action Movie II, by the tablet, becomes unsynchronized with the playing of Action Movie II by Living Room DVR. Further assume that content synchronizing application 220 causes the tablet to periodically transmit, to server 240, information identifying a point within Action Movie II currently played by the tablet. As shown in FIG. 7D, content synchronizing application 220 may cause the tablet to transmit, to server 240, information identifying a timestamp corresponding to a particular point within Action Movie II currently played by the tablet. As further shown in FIG. 7D, server 240 may transmit a request for another particular point within Action Movie II currently played by Living Room DVR and server 240 may receive, from Living Room DVR, information identifying a timestamp corresponding to the other particular point within Action Movie II. Assume that server 240 determines that the timestamp, received from the tablet, does not match the timestamp received from Living Room DVR. Further assume that server 240 identifies an updated synchronization point based on the timestamp, received from the tablet, and the timestamp received from Living Room DVR. As further shown in FIG. 7D, server 240 may update the stream, based on the updated synchronization point, to generate a synchronized stream of Action Movie II and transmit the synchronized stream to the tablet. As shown in FIG. 7E, a point within Action Movie II, currently played by Living Room DVR, may be played by the tablet, thereby re-synchronizing the playing of Action Movie II between Chris' tablet and Living Room DVR.

As indicated above, FIGS. 7A-7E are provided merely as an example. Other examples are possible and may differ from what was described with regard to FIGS. 7A-7E.

Figure 8:
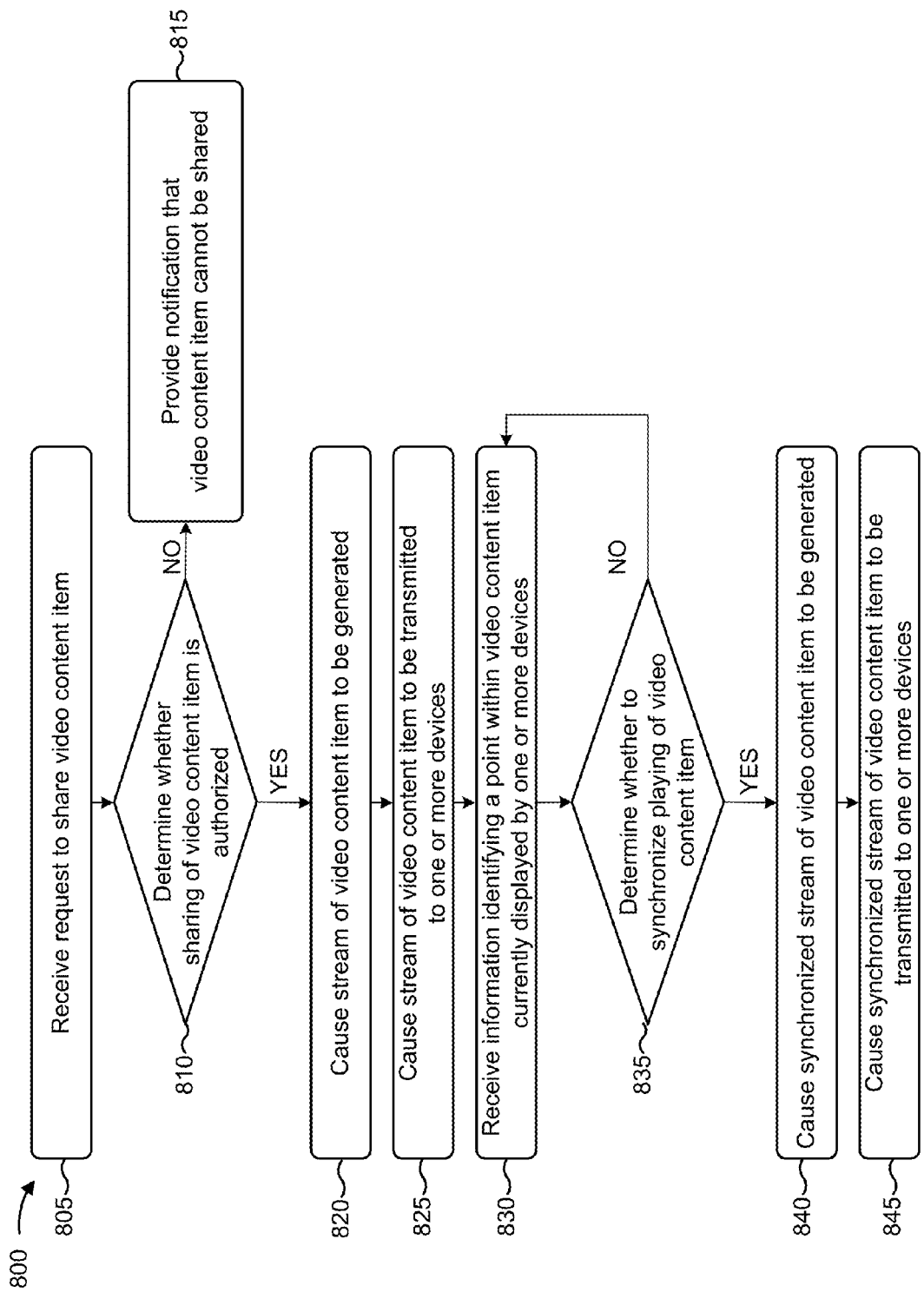
FIG. 8 is a flow chart of an example process for synchronizing content.

FIG. 8 is a flowchart of an example process for synchronizing content. In some implementations, one or more process blocks of FIG. 8 may be performed by user device 210. In some implementations, one or more process blocks of FIG. 8 may be performed by another device or a group of devices separate from or including user device 210, such as server 240 and/or one or more other user devices 250.

As shown in FIG. 8, process 800 may include receiving a request to share a video content item (block 805). For example, user device 210 (e.g., a DVR) may receive a request to share a video content item that is stored in a memory associated with user device 210. In some implementations, the video content item may be currently played by user device 210. In some implementations, the request may include information identifying the video content item and/or user identification information (e.g., information identifying one or more devices transmitting the request, information identifying one or more users associated with the one or more devices, and/or authentication information associated with requesting the video content item).

In some implementations, the one or more users may include a user of user device 210. For example, user device 210 may be providing the video content item for display to the user, and the user may initiate content synchronizing application 220 of user device 210 and may submit a request (e.g., using a remote control associated with user device 210) to share the video content item via content synchronizing application 220. For instance, the user may desire to share the video content item with another user for a synchronized playing of the video content item. In some implementations, content synchronizing application 220 may identify a content sharing group of the user, provide information regarding the content sharing group for display to the user, and receive an input, from the user, selecting information identifying the other user from the information regarding the content sharing group. In some implementations, based on the information identifying the other user, content synchronizing application 220 may transmit a notification, to the other user, regarding the request to share the video content item for the synchronized playing of the video content item. For example, the notification may include information identifying the video content item and the information identifying the user. In some implementations, the one or more users may include the other user. For example, the other user may transmit a request to share the video content item currently played by user device 210.

In some implementations, user device 210 may receive the request from a device (e.g., a first user device 250) associated with the user and a device (e.g., a second user device 250) associated with the other user as part of a request for a synchronized playing of the video content item by the first user device 250 and the second user device 250. In some implementations, content synchronizing application 220 may cause user device 210 to transmit, to the first user device 250 and the second user device 250, information identifying video content items (e.g., stored in a memory associated with user device 210). The first user device 250 and the second user device 250 may transmit the request by selecting information identifying the video content item from the information identifying the video content items.

As further shown in FIG. 8, process 800 may include determining whether sharing of the video content item is authorized (block 810). For example, user device 210 may determine whether sharing of the video content item is authorized. In some implementations, user device 210 may determine whether the one or more users are authorized to receive the video content item. For example, user device 210 may obtain information regarding a content sharing group associated with user device 210 and determine whether the one or more users are authorized to receive the video content item based on whether the information regarding the content sharing group includes the information identifying the one or more users. Additionally, or alternatively, user device 210 may transmit a request (e.g., including the information identifying the one or more users) to server 240 to determine whether a subscription for services, of the one or more users, authorizes the one or more users to receive the video content item. Additionally, or alternatively, user device 210 may determine whether an input, indicating a desire for the synchronized playing, has been received from the other user in response to the notification.

As further shown in FIG. 8, if sharing of the video content item is not authorized (block 810—NO), then process 800 may include providing a notification that the video content item cannot be shared (block 815). For example, user device 210 may provide a notification that the video content item cannot be shared. For instance, the notification may indicate that the one or more users are not authorized to receive the video content item because of the subscription of the one or more users, because no input, indicating a desire for the synchronized playing of the video content item, has been received from the other user, and/or because the content sharing group does not include the information identifying the one or more users. In some implementations, user device 210 may transmit the notification to the one or more users.

As further shown in FIG. 8, if sharing of the video content item is authorized (block 810—YES), then process 800 may include causing a stream of the video content item to be generated (block 820). For example, content synchronizing application 220 may cause a stream of the video content item to be generated via user device 210. In some implementations, content synchronizing application 220 may cause the stream of the video content item to be generated in a manner similar to that described above with respect to block 630.

As further shown in FIG. 8, process 800 may include causing the stream of the video content item to be transmitted to the one or more devices (block 825). For example, content synchronizing application 220 may cause the stream of the video content item to be transmitted to the one or more devices after causing the stream of the video content item to be generated. For instance, content synchronizing application 220 may cause the stream of the video content item to be transmitted by user device 210 to the one or more devices. Alternatively, content synchronizing application 220 may cause the stream of the video content item to be transmitted by server 240 to the one or more devices.

As further shown in FIG. 8, process 800 may include receiving information regarding a point within the video content item currently played by the one or more devices (block 830). For example, after causing the stream of the video content item to be transmitted, content synchronizing application 220 may receive, from each of the one or more devices, information identifying a respective point (e.g., a timestamp, a video frame, or the like) within the video content item currently played by each of the one or more devices. In some implementations, content synchronizing application 220 may periodically transmit a request for the respective point to each of the one or more devices and receive the information identifying the respective point from each of the one or more devices based on the request. In some implementations, content synchronizing application 220 may periodically receive the information identifying the respective point from each of the one or more devices without sending the request.

As further shown in FIG. 8, process 800 may include determining whether to synchronize the playing of the video content item (block 835). For example, content synchronizing application 220 may determine whether to perform a synchronization operation to synchronize the playing of the video content item by user device 210 and the one or more devices. In some implementations, content synchronizing application 220 may determine whether to perform the synchronization operation based on the information identifying the respective point received from each of the one or more devices and/or a point (e.g., a timestamp, a video frame, or the like) within the video content item currently played by user device 210. In some implementations, content synchronizing application 220 may compare the information identifying the respective point within the video content item, received from each of the one or more devices, with the information identifying the point within the video content item currently played by user device 210. Based on the comparison, content synchronizing application 220 may determine whether the playing of the video content item, by user device 210 and the one or more devices, is synchronized. Additionally, or alternatively, content synchronizing application 220 may compare the information identifying the respective point within the video content item, received from each of the one or more devices, with the information identifying the respective point within the video content item received from another one of the one or more devices. Based on the comparison, content synchronizing application 220 may determine whether the playing of the video content item, by the one or more devices, is synchronized.

As further shown in FIG. 8, if the playing of the video content item is to not be synchronized (block 835—NO), then process 800 may return to block 830. For example, if content synchronizing application 220 determines that the playing of the video content item, by the one or more devices and/or user device 210, is synchronized, content synchronizing application 220 may determine to not perform the synchronization operation.

In some implementations, content synchronizing application 220 may determine that the playing of the video content item, by the one or more devices and/or user device 210, is synchronized based on content synchronizing application 220 identifying a threshold level match as a result of the comparisons.

As further shown in FIG. 8, if the playing of the video content item is to be synchronized (block 835—YES), then process 800 may include causing a synchronized stream of the video content item to be generated (block 840). For example, if, based on the comparisons, content synchronizing application 220 determines that the playing of the video content item, by the one or more devices and/or user device 210, is not synchronized, content synchronizing application 220 may perform the synchronization operation to synchronize the playing of the video content item.

As explained above, in some implementations, the synchronization operation may be performed based on an amount of time by which playing of the particular video content item, by the one or more devices and/or user device 210, is not synchronized. For example, the synchronization operation may be performed when the amount of time meets and/or exceeds a threshold amount of time (e.g., 5 seconds, 10 seconds, 30 seconds, etc.).

In some implementations, content synchronizing application 220 may update the stream of the video content item, based on a synchronization point, to generate a synchronized stream of the video content item. In some implementations, content synchronizing application 220 may determine the synchronization point based on the information identifying the respective point within the video content item received from the one or more devices and/or the information identifying the point within the video content item that is being played by user device 210. For example, content synchronizing application 220 may determine the synchronization point as corresponding to the respective point received from a particular one of the one or more devices or corresponding to the point within the video content item that is being played by user device 210. Additionally, or alternatively, content synchronizing application 220 may compute (e.g., calculate or estimate) a midpoint relative to the respective point received from each of the one or more devices and/or the point within the video content item that is being played by user device 210 and determine the synchronization point as corresponding to the midpoint.

Additionally, or alternatively, content synchronizing application 220 may obtain information regarding delay factors associated with the one or more devices (e.g., information regarding network connection speed associated with the one or more devices, information regarding network latency associated with the one or more devices, information regarding capabilities of the one or more devices relating to playing video content, or the like) and determine the synchronization point based on the delay factors. For instance, content synchronizing application 220 may compute a period of time corresponding to the delay factors. For example, content synchronizing application 220 may compute the period of time based on the respective point within the video content item, received from each of the one or more devices, and the point within the video content item currently played by user device 210. Content synchronizing application 220 may then determine the synchronization point based on the period of time and a particular point within the video content item (e.g., corresponding to the respective point received from the particular one of the one or more devices or corresponding to the point within the video content item played by user device 210). For example, content synchronizing application 220 may determine the synchronization point as a point preceding the particular point by the period of time or as a point following the particular point by the period of time.

As further shown in FIG. 8, process 800 may include causing the synchronized stream of the video content item to be transmitted to the one or more devices (block 845). For example, content synchronizing application 220 may cause user device 210 to transmit the synchronized stream of the video content item to the one or more devices, thereby synchronizing the playing of the video content item. In some implementations, based on the synchronization point, content synchronizing application 220 may cause the playing of the video content item to be suspended (e.g., paused), to be slowed down, or to be sped up at user device 210 and/or at the one or more devices, in a manner similar to that described above with respect to blocks 645 and 650. For example, content synchronizing application 220 may transmit information, to the one or more devices, to suspend playing of the video content item, to slow down playing of the video content item, or to speed up playing of the video content item to synchronize the playing of the video content item (e.g., instead of causing the stream of the video content item to be updated and causing the synchronized stream of the video content item to be transmitted). In some implementations, content synchronizing application 220 may identify, in the user information, a frequency for initiating the synchronization operation to synchronize the playing of the video content item and may cause blocks 830, 835, 840, and 845 to be periodically repeated based on the frequency, in a manner similar to that described with respect to block 655.

As explained above with respect to block 655, messages may be exchanged during the synchronized playing of the video content item and may be stored.

In some implementations, user device 210 may cause the one or more devices to tune to a channel that provides the video content item. For example, if the video content item is non-recorded content and the video content item is provided on the channel, user device 210 may cause the one or more devices (e.g., one or more set top boxes) to tune to the channel.

As explained above, in some implementations, one or more process blocks of FIG. 8 may be performed by another device or a group of devices separate from or including user device 210, such as server 240 and/or one or more other user devices 250. For example, user device 210 may receive the request to share the video content item and may transmit the request to server 240 to cause server 240 to perform blocks 810, 815, 820, 825, 830, 835, 840, and/or 845. Alternatively, server 240 may perform all the blocks of FIG. 8.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9B:
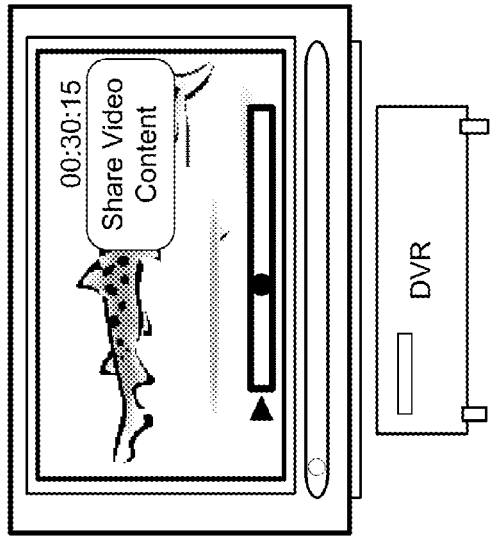
Figure 9C:
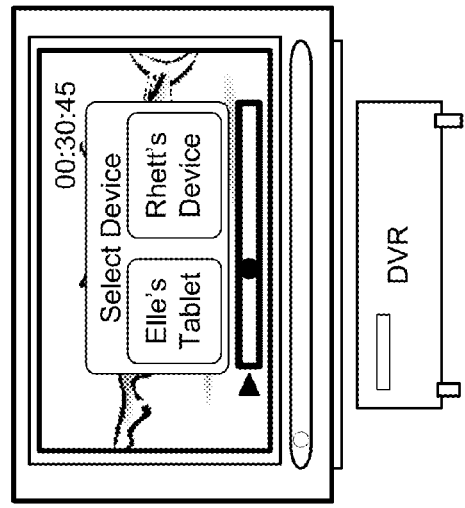
Figure 9A:
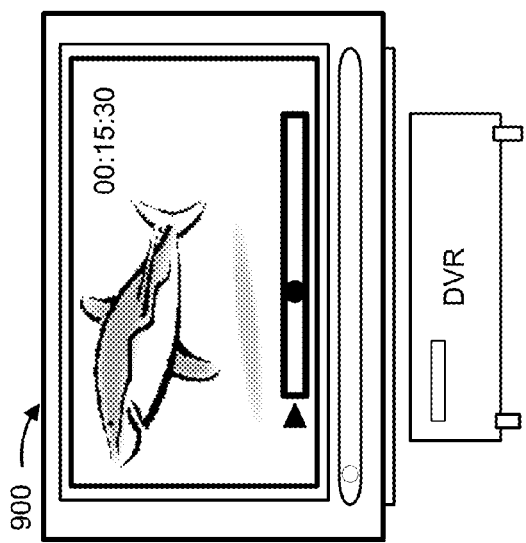

FIGS. 9A-9G are diagrams of an example 900 of process 800 described above with respect to FIG. 8. As shown in FIG. 9A, a device (e.g., a DVR) may provide a video content item (e.g., recorded video content relating to sharks) for display to a user (Chris) via a display, such as a television. As shown in FIG. 9A, assume that the DVR is executing content synchronizing application 220. Further assume that Chris remembers that Elle enjoys content relating to sharks and that Chris desires to share the video content item with Elle for a synchronized playing of the video content item. Further assume that the user has submitted, via content synchronizing application 220, a request to share the video content item with Elle for the synchronized playing of the video content item.

As shown as an example in FIG. 9B, content synchronizing application 220 may cause the DVR to provide, for display, information indicating that the video content item is to be shared. Assume that content synchronizing application 220 has identified devices (e.g., Elle's tablet and Rhett's device) with which the video content item may be shared. As shown as an example in FIG. 9C, content synchronizing application 220 may cause the DVR to provide, for display, a button labeled Elle's tablet and a button labeled Rhett's device.

Assume that Chris selects the button labeled Elle's tablet. Further assume that content synchronizing application 220 transmits a notification, to Elle's tablet, regarding the request to share the video content item with Elle based on Chris' selection.

As shown in FIG. 9D, Elle's tablet may display the notification and may prompt Elle to accept or decline Chris' request by displaying a button labeled Accept and a button labeled Decline. As shown as in FIG. 9D, assume that Elle selects the button labeled Accept to submit an input accepting Chris' request.

Assume that content synchronizing application 220 receives Elle's input. Further assume that, based on Elle's input, content synchronizing application 220 identifies a point within the video content item that is currently being displayed to Chris and that content synchronizing application 220 has caused a stream of the video content to be generated based on the point within the video content item. As shown in FIG. 9E, content synchronizing application 220 may transmit the stream of the video content item to Elle's tablet to synchronize the playing of the video content item between the DVR and Elle's tablet.

As further shown in FIG. 9E, Chris may submit, via content synchronizing application 220, a message to Elle and content synchronizing application 220 may cause the message to be transmitted to Elle's tablet for display to Elle. As shown in FIG. 9F, Elle may submit a message to Chris and content synchronizing application 220 may cause the message to be displayed to Chris. As further shown in FIG. 9F, assume that due to network latency, playing of the video content item, by the tablet, becomes unsynchronized with the playing of the video content item by the DVR. As further shown in FIG. 9F, based on a frequency for initiating a synchronization operation to synchronize playing of the video content item, the tablet may transmit, to the DVR, information identifying a particular point within the video content currently played by the tablet.

Assume that content synchronizing application 220 determines, based on the information identifying the particular point within the video content, that the playing of the video content is no longer synchronized. Further assume that, based on the information identifying the particular point within the video content, content synchronizing application 220 identifies a synchronization point in the video content item to re-synchronize the playing of the video content item.

Further assume that content synchronizing application 220 updates the stream of the video content item based on the synchronization point.

As shown in FIG. 9G, content synchronizing application 220 may cause the updated stream of the video content item to be transmitted to the tablet. As further shown in FIG. 9G, a point within the video content item, currently played by the DVR, may be played by the tablet, thereby maintaining the synchronized playing of the video content item.

As indicated above, FIGS. 9A-9G are provided merely as an example. Other examples are possible and may differ from what was described with regard to FIGS. 9A-9G.

Systems and/or methods described herein may synchronize playing of video content that is provided for display by different devices. Systems and/or methods described herein may also periodically identify a synchronization point during the playing of video content. The synchronization point may be used to periodically perform a synchronization operation to maintain a synchronized playing of the video content. Systems and/or methods described herein may also enable messages to be exchanged between users of the different devices and to be displayed during the synchronized playing of the video content. Systems and/or methods described herein may also enable, during the synchronized playing of the video content, other types of social interaction, such as voice chat, video chat, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that example aspects, as described above, may be implemented in many different forms of firmware, hardware, or a combination of hardware and software in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
a memory to store instructions; and
one or more processors operatively connected to the memory, the one or more processors to execute the instructions to:
provide a video content item for display,
receive, after providing the video content item for display, a request to share the video content item with another device for a synchronized playing of the video content item by the device and the other device,
generate a stream of the video content item based on a point within the video content item currently played by the device,
transmit the stream of the video content item to the other device to synchronize playing of the video content by the device and the other device,
obtain, from the other device, information identifying a particular point within the video content item currently played by the other device,
determine a synchronization point, in the video content item, based on the information identifying the particular point within the video content item,
identify, based on determining the synchronization point, a frequency for initiating synchronization of playing of the video content item by the device and the other device,
periodically update, based on the synchronization point and based on the frequency, the stream of the video content item to generate a synchronized stream of the video content item, and transmit the synchronized stream of the video content item, to the other device, to re-synchronize playing of the video content item by the device and the other device.

2. The device of claim 1, where, when obtaining the information identifying the particular point within the video content item, the one or more processors are to:
   periodically obtain information identifying a particular point within the video content item currently played by the other device based on the frequency,
   where, when determining the synchronization point, the one or more processors are to:
      periodically determine a particular synchronization point, in the video content item, based on the information identifying the particular point within the video content item, and
   where, when periodically updating the stream of the video content item, the one or more processors are to:
      periodically update, based on the frequency, the stream of the video content item based on the particular synchronization point.

3. The device of claim 1, where the one or more processors are further to:
   obtain information regarding network latency associated with the other device, and
   where, when determining the synchronization point, the one or more processors are to:
      determine the synchronization point further based on the information regarding the network latency.

4. The device of claim 3, where the one or more processors are further to:
   determine a period of time associated with the network latency, and
   where, when determining the synchronization point further based on the information regarding the network latency, the one or more processors are to:
      determine the synchronization point further based on the period of time.

5. The device of claim 1, where the one or more processors are further to:
   receive a message from a user of the other device,
   provide the message, for display, with the video content item, and
   store the message in association with the video content item in a memory associated with the device.

6. The device of claim 1, where the one or more processors are further to:
   receive another request to share the video content item with an additional device, and
   transmit, based on the other request, the stream of the video content item, to the additional device, to synchronize playing of the video content item by the device, the other device, and the additional device.

7. The device of claim 1, where, when identifying the frequency for initiating synchronization of playing of the video content item by the device and the other device, the one or more processors are to:
   identify the frequency for initiating synchronization of playing of the video content item by the device and the other device based on user information associated with a user of the device.

8. A non-transitory computer-readable medium storing instructions, the instructions comprising:
   one or more instructions which, when executed by one or more processors of a device, cause the one or more processors to:
      receive a request, from a first user device and a second user device, to synchronize playing of a video content item by the first user device and the second user device,
         the video content item being stored in a memory associated with the device;
      generate a stream of the video content item based on the request;
      transmit, to the first user device and to the second user device, the stream of the video content item to synchronize playing of the video content item between the first user device and the second user device;
      obtain:
         information identifying a first point within the video content item currently played by the first user device, and
         information identifying a second point within the video content item currently played by the second user device;
      determine whether to update the stream of the video content item based on the information identifying the first point within the video content item and the information identifying the second point within the video content item;
      identify, based on determining whether to update the stream of the video content item, a frequency for initiating synchronization of playing of the video content item by the first user device and the second user device,
      periodically update, based on determining whether to update the stream of the video content item and based on identifying the frequency, the stream of the video content item to generate a synchronized stream of the video content item; and
      transmit, to the first user device or to the second user device, the synchronized stream of the video content item to re-synchronize playing of the video content item by the first user device and the second user device.

9. The non-transitory computer-readable medium of claim 8, where the instructions further include:
   one or more instructions to determine that the stream of the video content item is to be updated;
   one or more instructions to identify a synchronization point, in the video content item, based on the information identifying the first point within the video content item and the information identifying the second point within the video content item; and
   where the one or more instructions to update the stream of the video content item include:
      one or more instructions to update the stream of the video content item based on the synchronization point.

10. The non-transitory computer-readable medium of claim 9, where the instructions further include:
   one or more instructions to obtain information regarding network latency associated with at least one of the first user device or the second user device, and
   where the one or more instructions to identify the synchronization point include:
      identify the synchronization point further based on the information regarding the network latency.

11. The non-transitory computer-readable medium of claim 8, where the instructions further include:

one or more instructions to cause messages to be transmitted between the first user device and the second user device; and
one or more instructions to cause the messages to be displayed, by the first user device and the second user device, with the video content item.

12. The non-transitory computer-readable medium of claim 8, where the device is associated with a first user,
where the first user device is associated with the first user, and
where the instructions further comprise:
one or more instructions to determine whether a second user, associated with the second user device, is authorized to receive the video content item.

13. The non-transitory computer-readable medium of claim 8, where the instructions further comprise:
one or more instructions to identify a plurality of video content items;
one or more instructions to provide information identifying the plurality of video content items to the first user device and the second user device for display; and
where the one or more instructions to receive the request include:
one or more instructions to receive the request based on the first user device or the second user device selecting information identifying the video content item from the information identifying the plurality of video content items.

14. The non-transitory computer-readable medium of claim 8, where the one or more instructions to identify the frequency for initiating synchronization of playing of the video content item by the first user device and the second user device include:
one or more instructions to identify the frequency for initiating synchronization of playing of the video content item by the first user device and the second user device based on at least one of user information of a user associated with the first user device or a user of the second user device.

15. A method comprising:
providing, by a device, a video content item for display;
receiving, by the device and after providing the video content item for display, a request to share the video content item with another device for a synchronized playing of the video content item by the device and the other device;
generating, by the device, a stream of the video content item based on a point within the video content item currently being played by the device;
transmitting, by the device, the stream of the video content item to the other device to synchronize playing of the video content item by the device and the other device;
obtaining, by the device, information identifying a point within the video content item currently played by the other device;
determining, by the device, a synchronization point, in the video content item, based on the information identifying the point within the video content item;
identifying, by the device and based on determining the synchronization point, a frequency for initiating synchronization of playing of the video content item by the device and the other device,
periodically updating, by the device, based on the synchronization point, and based on the frequency, the stream of the video content item to obtain a synchronized stream of the video content item; and
transmitting, by the device, the synchronized stream of the video content item, to the other device, to re-synchronize playing of the video content item by the device and the other device.

16. The method of claim 15, further comprising:
determining, based on the information identifying the point within the video content item, that playing of the video content item is not synchronized between the device and the other device, and
where determining the synchronization point includes:
determining the synchronization point based on determining that playing of the video content item is not synchronized.

17. The method of claim 15, where receiving the request includes:
receiving the request from the other device.

18. The method of claim 15, where receiving the request includes:
receiving the request from a user of the device.

19. The method of claim 15, further comprising:
transmitting a message, to the other device, for display with the video content item;
receiving another message, from the other device, responsive to the message;
providing the other message for display with the video content item; and
storing the message and the other message in association with the video content item.

20. The method of claim 15, further comprising:
obtaining information regarding network latency associated with the other device, and
where determining the synchronization point includes:
determining the synchronization point further based on the information regarding the network latency.

* * * * *